US012632699B2

(12) United States Patent
Zheng et al.

(10) Patent No.: US 12,632,699 B2
(45) Date of Patent: May 19, 2026

(54) TEMPORAL-AWARE AND LOCAL-AGGREGATION GRAPH NEURAL NETWORKS

(71) Applicant: Accenture Global Solutions Limited, Dublin (IE)

(72) Inventors: Xu Zheng, Dublin (IE); Jeremiah Hayes, Dublin (IE); Ramon Torne, Girona (ES)

(73) Assignee: Accenture Global Solutions Limited, Dublin (IE)

( * ) Notice: Subject to any disclaimer, the term of this patent is extended or adjusted under 35 U.S.C. 154(b) by 856 days.

(21) Appl. No.: 17/954,006

(22) Filed: Sep. 27, 2022

(65) Prior Publication Data

US 2024/0104348 A1 Mar. 28, 2024

(51) Int. Cl.
*G06N 3/04* (2023.01)
*G06N 3/045* (2023.01)
*G06N 3/047* (2023.01)

(52) U.S. Cl.
CPC ............. *G06N 3/045* (2023.01); *G06N 3/047* (2023.01)

(58) Field of Classification Search
CPC ...................................................... G06N 3/045
See application file for complete search history.

(56) References Cited

U.S. PATENT DOCUMENTS

| | | | | |
|---|---|---|---|---|
| 2023/0027427 A1* | 1/2023 | Ma | ............................. | G06F 18/10 |
| 2023/0049817 A1* | 2/2023 | Shi | ......................... | G06F 18/211 |
| 2023/0230484 A1* | 7/2023 | Al Faruque | ............. | G06V 20/56 |
| 2023/0334338 A1* | 10/2023 | Moon | ....................... | G06N 5/02 |
| 2023/0394318 A1* | 12/2023 | Cardoso | ................. | G06N 3/045 |

OTHER PUBLICATIONS

Kumar, Srijan, Xikun Zhang, and Jure Leskovec. "Learning dynamic embeddings from temporal interactions." arXiv preprint arXiv: 1812.02289 (2018). (Year: 2018).*
Kosan, Mert, et al. "Event detection on dynamic graphs." arXiv preprint arXiv:2110.12148 (2021). (Year: 2021).*
Ji, Yugang, et al. "Dynamic heterogeneous graph embedding via heterogeneous hawkes process." Joint European Conference on Machine Learning and Knowledge Discovery in Databases. Cham: Springer International Publishing, 2021. (Year: 2021).*

(Continued)

*Primary Examiner* — Hal Schnee

(74) *Attorney, Agent, or Firm* — Seed Intellectual Property Law Group LLP

(57) ABSTRACT

A temporal-aware or permutation-dependent Graph Neural Network (GNN) is disclosed. The example GNN is implemented by combining temporal-awareness with multi-layer neighborhood aggregation to further provide the GNN with inductive capabilities with respect to generating embeddings of a dynamic graph, all without creating multiple time snapshots of the graph. By using a temporal-aware message pass scheme involving a temporal-aware and permutation-dependent GNN, a set of temporal-aware local neighborhood aggregator functions may be effective trained and used for generating embeddings for unknow nodes and for providing more accurate embeddings for subsequent prediction tasks.

16 Claims, 9 Drawing Sheets

600

(56)         References Cited

OTHER PUBLICATIONS

Jiang, Xiaolong, et al. "Graph neural based end-to-end data association framework for online multiple-object tracking." arXiv preprint arXiv:1907.05315 (2019). (Year: 2019).*

Zhang, Chuxu, et al. "Heterogeneous graph neural network." Proceedings of the 25th ACM SIGKDD international conference on knowledge discovery & data mining. 2019. (Year: 2019).*

Hamilton W et al.; "Inductive representation learning on large graphs"; Advances in neural information processing systems; $31^{st}$ Conference on Neural Information Processing Systems (NIPS 2017), Long Beach, California; 2017; 30; 11 pages.

Kazemi S M et al.; "Representation Learning for Dynamic Graphs: A Survey"; Journal of Machine Learning Research 21 (70); Jan. 1, 2020; pp. 1-73.

Jiaxuan You et al.; "Handling Missing Data with Graph Representation Learning"; $34^{th}$ Conference on Neural Information Processing Systems (NeurIPS 2020), Vancouver, Canada; 33:19075-87; 2020;13 pages.

Rossi E et al.; "Temporal Graph Networks for Deep Learning on Dynamic Graphs"; arXiv preprint arXiv:2006; 10637; Jun. 18, 2020; 16 pages.

* cited by examiner

100

102

104

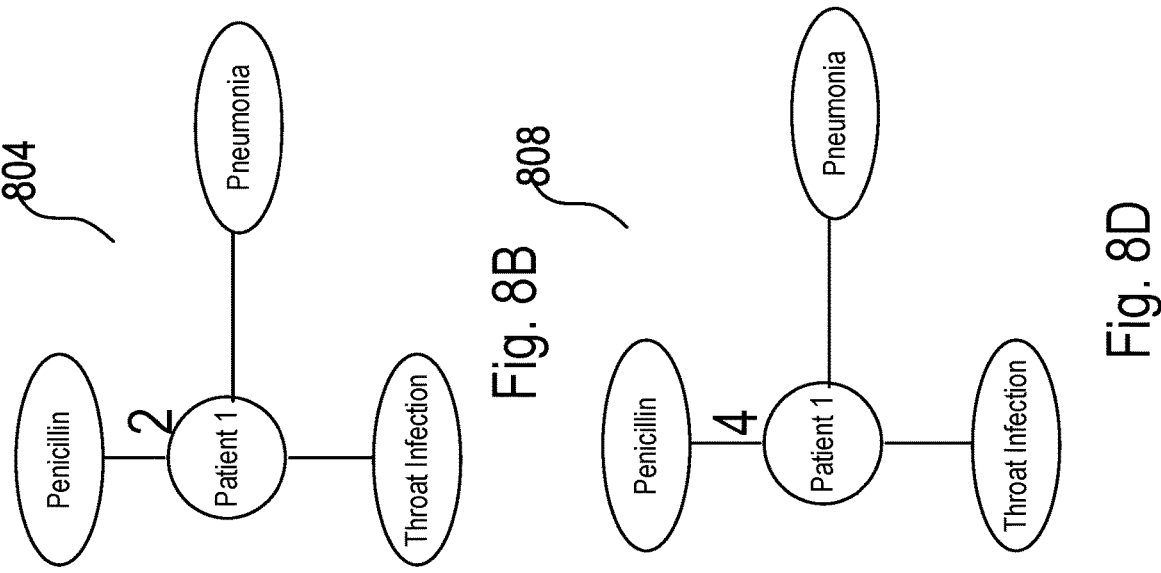
Fig. 8A
Fig. 8B
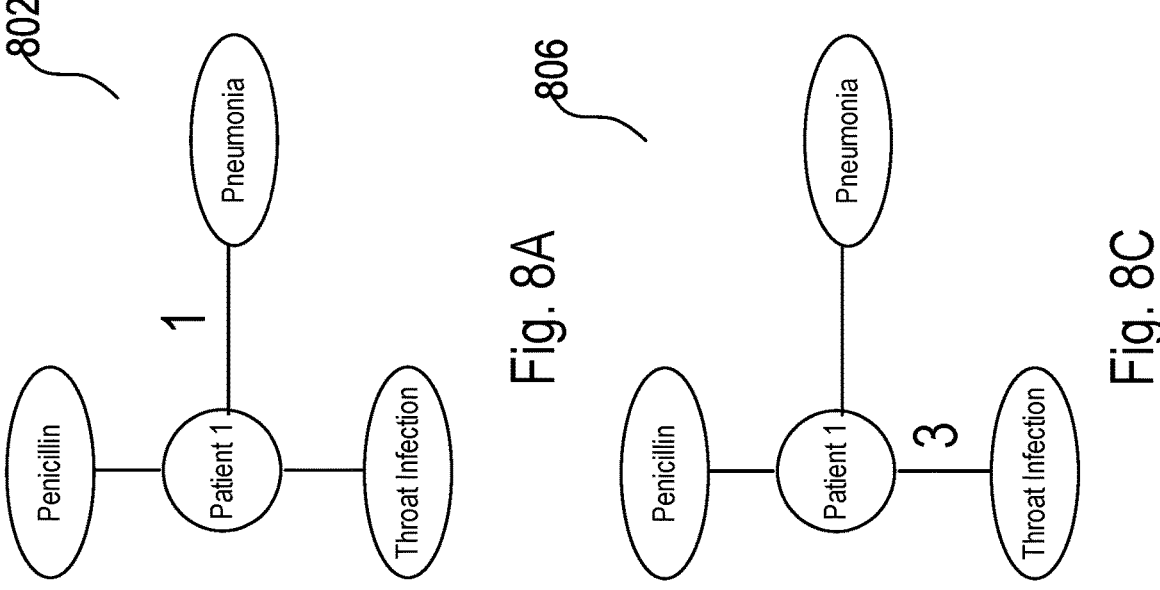
Fig. 8C
Fig. 8D

TEMPORAL-AWARE AND LOCAL-AGGREGATION GRAPH NEURAL NETWORKS

BACKGROUND

Technical Field

This disclosure generally relates to graph neural networks (GNNs) and is particularly directed to generating embedding vectors of a graph data structure and using the embedding vectors so generated for industrial control.

Background Technologies

A GNN represents a special type of multilayer neural network that may be trained and then used to process an input graph or knowledge graph containing a plurality of nodes and edges to extract features that may further be used for predictions. In comparison to traditional neural networks, a GNN may provide a lighter model (needing fewer model parameters) and may be more effective at modeling relational data.

BRIEF SUMMARY

This disclosure relates generally relates to GNNs and is particularly directed to a temporal-aware and temporal message passing learning strategies in GNNs that reduces a number of model parameters and improves both learning efficiency and accuracy.

In some example implementations, a machine learning system is provided. The system may include comprising a memory circuitry for storing computer instructions and a processor in communication with the memory circuitry. The processor may be configured to execute the computer instructions from the memory circuitry to receive a data structure representing a bipartite graph having a first type of node connected to a plurality of second type of nodes by a set of edges. The first type of node being associated with a subject entity whereas the plurality of second-type nodes being associated with a set of events, and the set of edges may be associated with occurrences of the set of events to the subject entity. The processor may be further configured to extract a time order of the set of edges according to occurrence times of the set of events to the subject entity; provide a first multilayer neural network being configured to implement a first aggregation function that is temporal-aware and permutation-dependent with respect to the set of events; provide a second multilayer neural network being configured to implement a second aggregation function that is permutation-invariant with respect to the set of events; generate a first-type embedding vector associated with the subject entity by processing the data structure with the time order using the first multilayer neural network, the first-type embedding vector being associated with a multidimensional embedding space; generate a set of second-type embedding vectors associated with the set of events in the multidimensional embedding space using the second multilayer neural network; and generate probability of occurrence of a target event to the subject entity based on the first-type embedding vector and the set of second-type embedding vectors using a prediction model.

BRIEF DESCRIPTION OF THE DRAWINGS

FIGS. 8A-8D illustrate a sequence of bipartite subgraphs suitable for carrying temporal information and for being processed by the temporal-aware GNN of FIG. 6.

DETAILED DESCRIPTION

This system will now be described in detail hereinafter with reference to the accompanied drawings, which form a part of the present disclosure, and which show, by way of illustration, various example implementations and embodiments. The system may, however, be embodied in a variety of different forms and, therefore, the disclosure herein is intended to be construed as not being limited to the embodiments set forth. Further, the disclosure may be embodied as methods, devices, components, systems, and/or platforms. Accordingly, embodiments of the disclosure may, for example, take the form of hardware, software, firmware or any combination thereof.

In general, terminology may be understood at least in part from usage in its context. For example, terms, such as "and", "or", or "and/or," as used herein may include a variety of meanings that may depend at least in part upon the context in which such terms are used. Typically, the term "or", if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

By way of introduction, a collection of complex data items may be used for description of various sophisticated application scenarios including but not limited to social networks, industrial operations, supply chain management, enterprise operations, and the like. These data items may include various physical or abstract entities and complex relationships therebetween. For example, in a social network or service network (e.g., a medical service/information network), a large number of personal entities, events, and other abstract entities may be inter-related directly or indirectly in various manners. For another example, in an industrial operation, such physical or abstract entities may include but are not limited to domain processes, facilities, equipment, sensors/sensor parameters, maintenance events, personnel hierarchies, supply chain entities, raw materials, intermediate products, final products, key performance measures, customers, power consumptions, emissions, and regulation compliances. These entities are usually connected/related in a complex manner.

Figure 1:
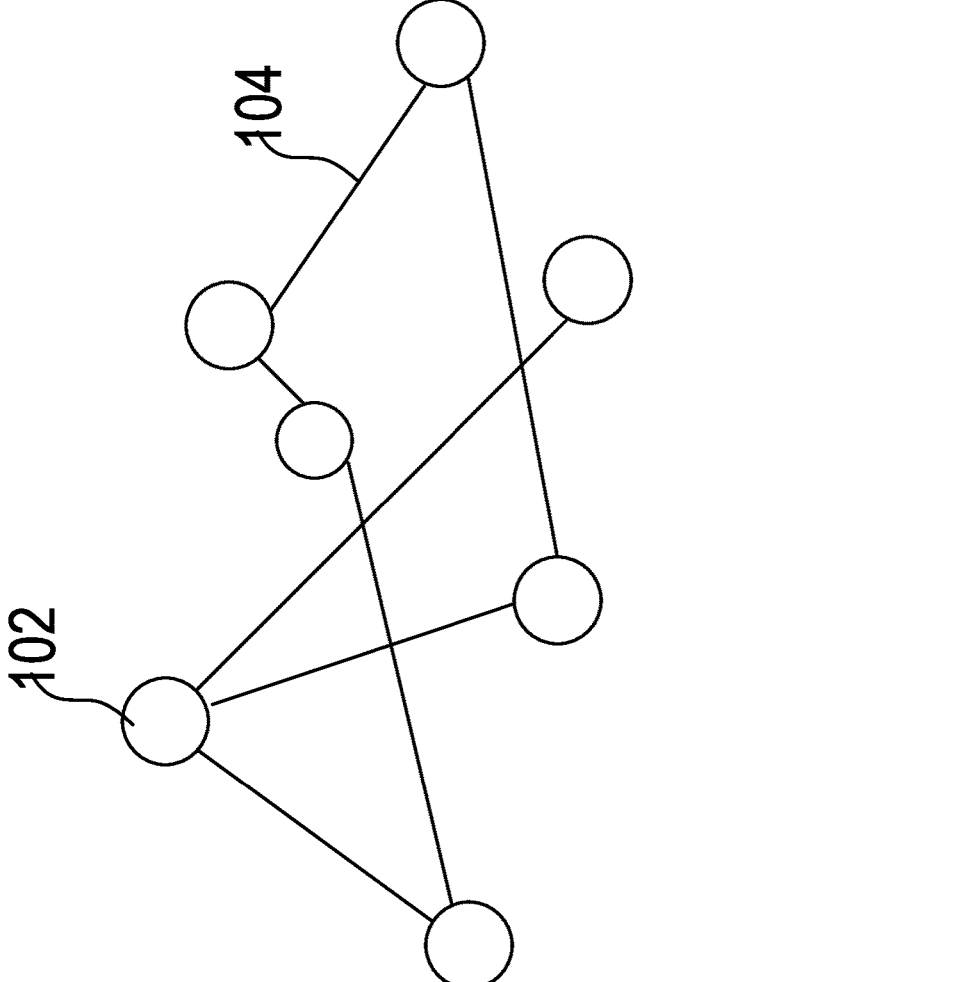
FIG. 1 illustrates a portion of a graph data structure represented by nodes and edges.

Because of the disparity and complexity of these data items, a traditional relational database (e.g., databases based on data tables) may not be suitable as an efficient layer for the storage and access of the various data items. Instead, these data items may be defined and stored in various types of graphic databases. The collection of the data items in a graphic database may be represented by a graph, or alternatively referred to as knowledge graph that encompasses a web of the various entities (or nodes) and relationships (or edges), as illustrated by 100 in FIG. 1, where the circles (such as 102) represent entities/nodes whereas the connecting lines (such as 104) represent relationships/edges.

The representation of these data items may vary in different graph implementations and framework. For example, in a Labeled Property Graph (LPG) framework, various entities and relationships may be represented by nodes (or vertices) and edges, respectively. Both nodes and edges may have internal data structures in an LPG framework. For example, a node may include various characteristics of the corresponding entity including its type and its various properties. Likewise, an edge may include characteristics such as its type and a pair of entity types it connects. The connection may be directional or non-directional between the pair of types of entities. For another example, in a Resource Description Framework (RDF) system or a Web Ontology Language (WOL) framework, while entities and relationships may be respectively represented by nodes/vertices and edges, these nodes/vertices and edges, unlike the LPG framework, may each be identified by a Unique Resource Identifier (URI) as a pure label and thus may not have any internal structures.

Creation and ingestion of a graph from various data sources for a particular application scenario may be based on a set of blue-prints specification referred to as a schema. A schema may specify an organization of the data items into a graph, including, for example, the types of entities and types of relationships. A schema may be designed based on data models developed for data domains relevant to a particular application. The specification of a schema may follow different forms or formats in different graph frameworks. For example, schemas from the LPG framework and the RDF framework may follow different formats.

A schema in a particular framework may be materialized to generate the graph by data extraction from various data sources. In other words, actual entities and relationships may be extracted from data sources based on particular constructions specified in the schema. A graph may grow or may be updated as new entities and relationships are extracted and materialized according to the schema. A graph or a portion extracted from a graph may be used as an input to an artificial intelligent model (e.g., a neural network) to generate predictions. Such predictions, for example, may include but are not limited to classification, clustering, and prediction of other characteristics of the nodes, and predicting new nodes or edges that were not originally in the graph (e.g., nodes and link predictions).

In some implementations, a graph may be converted into an alternative multidimensional vector space with each of the dimensions representing a certain relevant feature for describing the various nodes and edges in the graph. Such multidimensional vector space may be referred to as an embedding space. Each of the nodes or edges may be converted into an embedding vector in the multidimensional embedding space. The embedding vectors of the nodes and edges of the graph in the embedding space may be referred to as embeddings of the graph. The embeddings may be determined/learned via supervised or unsupervised learning techniques. Embeddings of like/similar nodes/edges may tend to stay close in the embedding space if the learning of these embeddings is effective.

Figure 2:
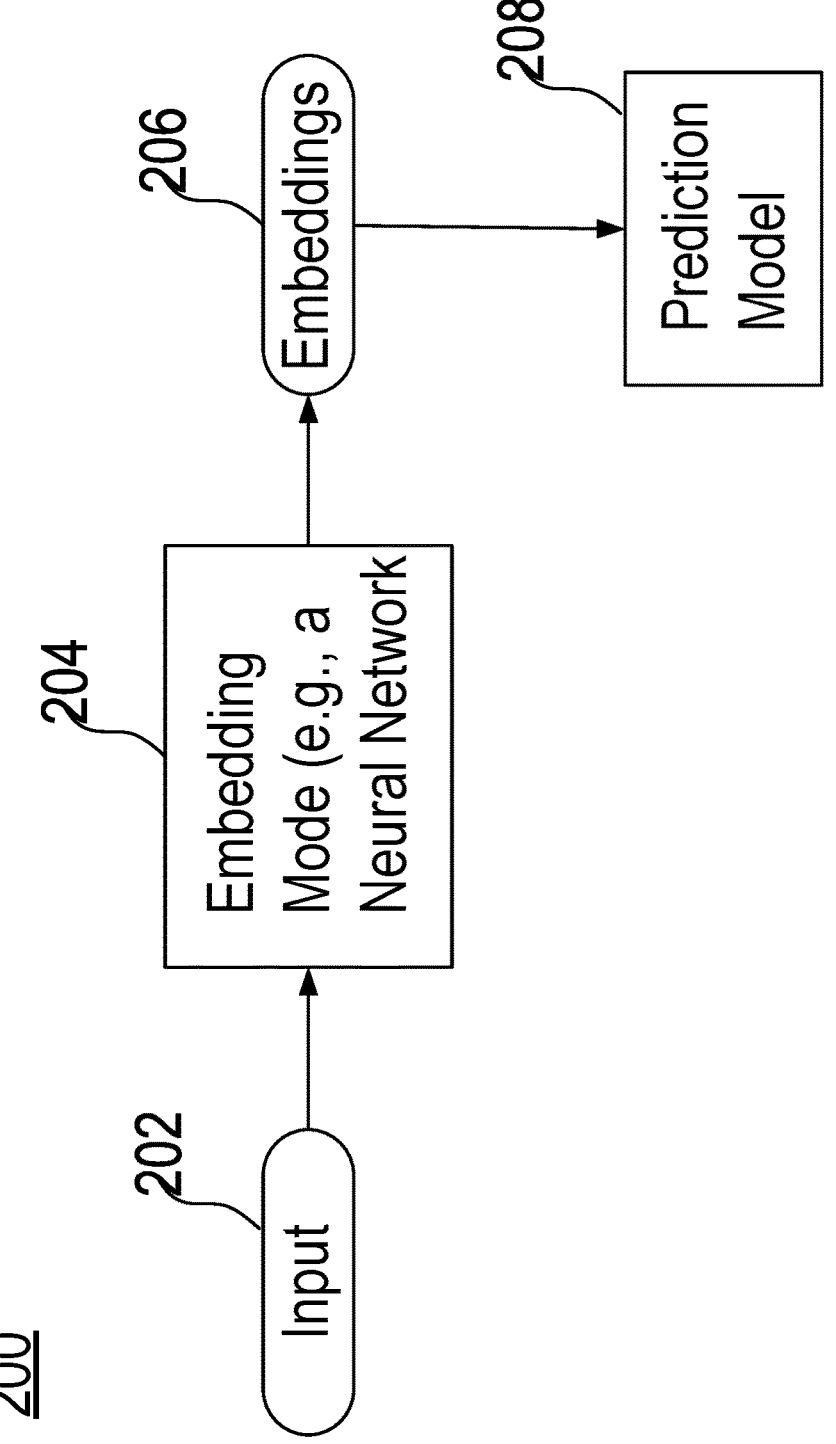
FIG. 2 illustrates a general processing flow for generating multi-dimensional embeddings from an input graph and for using the multi-dimensional embeddings for a predictive task.

In some example implementations, as shown by 200 in FIG. 2, an embedding model 204 may be used to generate the embeddings 206 from an input 202. The embedding model 204 may be implemented as, for example, a neural network, and the embeddings may be generate via forward-propagation of the input 202 through the neural network of the embedding model 204. Such model or neural network may be trained in order to learn the multi-dimensional correlation within the input datasets. Such a model or neural network may be referred to as an embedding model. In the general implementation shown in FIG. 2, output embeddings 206 generated by the embedding model 204 may be fed to a particular predictive model 208. The predictive model 208 may be configured to perform a task including but not limited to classification, clustering, segmentation, and the like. For example, the predictive model 208 may be implemented as another neural network that may be trained for processing the embeddings via forward propagation.

In some general implementations, the embedding model 204 may be jointly trained with the prediction model 208, particularly when the ground-truth labelling of training dataset can only be made available with respect to the predicted characteristics of the prediction model. The training process would then involve iteratively forward-propagating input training datasets through the embedding model 204, followed by feeding the generated embeddings 206 into the prediction model 208, followed by computing a loss function according to prediction error in comparison to ground-truth labels, and back-propagating through the prediction model 208 and the embedding model 204 to perform, for example, a gradient descent in order to adjust the model parameters of the prediction model 208 and the embedding model 204 to minimize the prediction loss.

Figure 3:
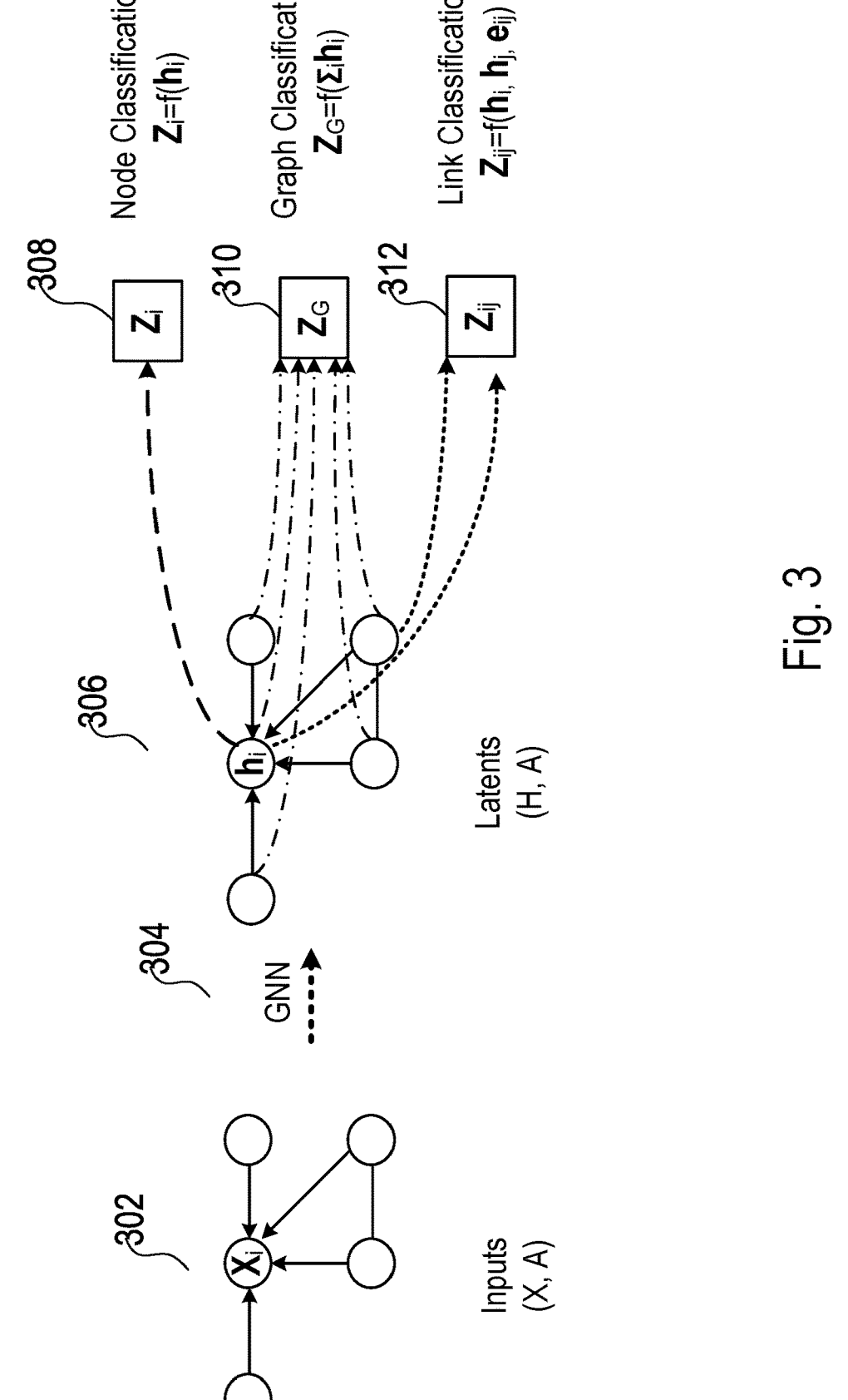
FIG. 3 illustrates a specific example processing flow for generating multi-dimensional embeddings from an input graph and for using the multi-dimensional embeddings for a predictive task.

A particular application of the implementations above as applied to graph input data is illustrated by 300 in FIG. 3, where the input 302 to the embedding GNN model 304 includes a data structure in the form of at least a portion of a graph containing nodes and edges. Example prediction models are shown as 308, 310, and 312 for graph node classification, graph classification, and link prediction, respectively. The predictive models as well as the embedding model, when implemented in the form of one or more neural networks for generating the embeddings of the input graph and for further processing the embeddings for predictions may be referred to as Graph Neural Networks (GNNs). Generally, a GNN refers to a type of deep leaning technology that directly operates on graph structure(s) to generate output(s). In some circumstances, a GNN may be used particularly refer to a multilayer neural network that operates on graph structure(s) to specifically generate representations of nodes and edges of the graph structure as multidimensional vectors (e.g., generation of embeddings). GNNs are particularly useful for modelling graph datasets, including social networks, citation networks, molecules, and the like, in order to generate the embeddings. By directly using graph structures as input and exploiting the inductive biases of graphs, GNNs are highly effective at modelling relational data items contained in the graph structures (such as social networks, citation networks, molecular structures, and the like). Such GNNs usually provide lighter models (with fewer parameters) that are effective in sparse regimes and achieve better generalisation performance than other neural architectures over a broad range of prediction tasks.

As shown in FIG. 3, the input graph 302 including nodes and edges, denoted as X and A. The input graph may be processed by the embedding GNN 304 to generate neural network latents (H, A) in the form of embedding vectors. The embedding vector for a node, $h_i$, for example, is shown in 306. The components of the embedding vector in the various learned dimensions of the embedding vector space may reflect the various learned correlations between the nodes and rest of the graph. The embeddings generated by embedding GNN 304 may be provided to the predictive models 308, 310, and/or 312. Information or parameters other than the embeddings may be provided/input to these prediction models as needed. For example, a node classification model 308 may be configured to place any input nodes in the form of its embedding vector into one of a plurality of predefined node classes. For another example, a graph classification model 310 may be configured to analyse embedding vectors of a plurality of nodes of a graph and place the input graph into one of a plurality of predefined graph classes. For yet another example, a link classification model may be configured to process embeddings of a pair of nodes and the edge therebetween in order to place the particular input link into one of a plurality of predefined link classes or categories coupled by an edge. As described above, model parameters in the GNN and the various prediction models may be jointly trained.

In some example implementations, input to the GNN may be a node and its neighborhood relations or may be a few nodes and their neighborhood relations in a graph, rather than the entire graph. The GNN may be configured to learn to aggregate feature information and correlation from such local neighborhood relations. Such aggregation may be implemented at various number of hops or search paths away from a given node in order to capture correlations of various adjacencies in the graph. Such a GNN may thus include a set of aggregator functions for aggregating feature information (e.g., embeddings) of graph neighbours of a particular node to various degrees. Once the GNN is trained, it may be used to generate embeddings of an unknown node by leveraging the trained embeddings of the known nodes and by inputting to the GNN the unknown node and its neighborhood which may be related to other known nodes or relationships in the graph.

Such implementations based on neighborhood aggregation are representative of an example of a general inductive approach to GNN rather than a transductive approach for the generation of embeddings. In a transductive approach, while a graph may be processed by the a GNN to generate embeddings of known nodes and edges for prediction tasks, such approach does not provide inductive capabilities to generate useful embeddings for unknown nodes. An inductive approach would produce a GNN that is capable of generating embeddings of unseen nodes and facilitating generalization across graphs with a same form of features. For example, an inductively trained GNN may perform embedding generation on protein-protein interaction graphs derived from a model organism and then conveniently produce node embeddings for data collected on new organisms using the trained GNN model.

The implementations based on neighborhood aggregations are suitable for generating inductive GNN because of their ability to capture multi-level neighbouring correlation that applies across known nodes and that is highly applicable to unknown nodes. An inductive node embedding GNN may need careful architectural design and training, in comparison to the transductive approaches, because generalizing to unseen nodes generally requires "aligning" newly observed subgraphs to the node embeddings that the algorithm has already optimized on.

Figure 4:
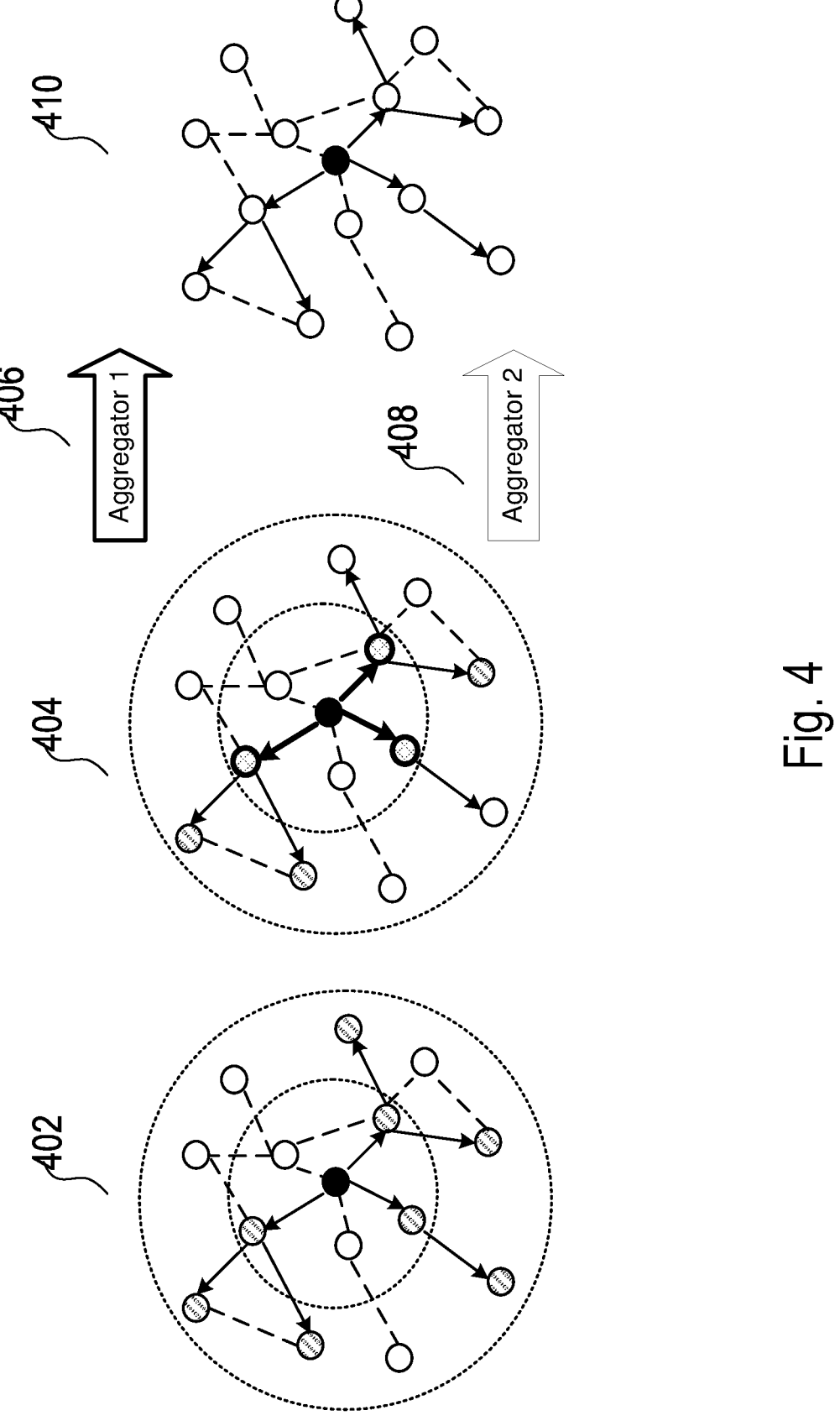
FIG. 4 illustrates a multi-level neighborhood aggregation scheme for learning or extracting features in a graph.
Figures 5A, 5B, 5C, 5D, 5E:
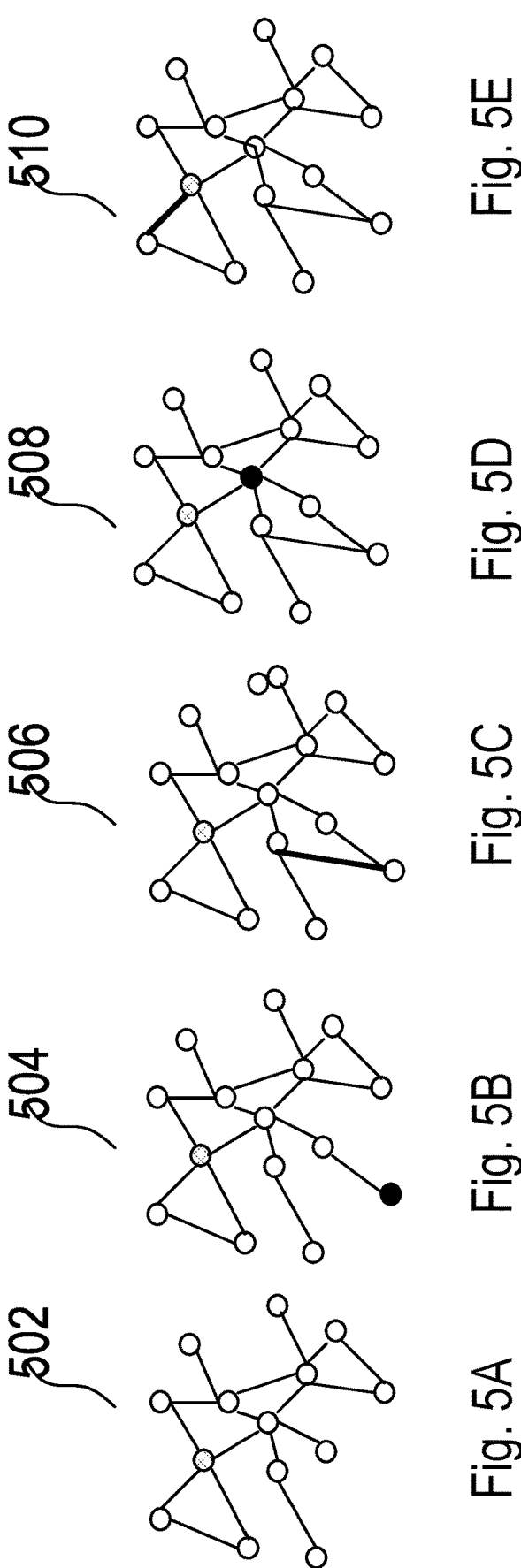
FIGS. 5A-5E illustrate example snapshots containing evolving nodes and edges of a dynamic graph.

FIG. 4 illustrates some underlying principles of an example inductive GNN configured to implement multi-level neighborhood aggregation to generate embeddings of input graph nodes and use the generate embeddings to perform predictive tasks. In particular, instead of training a distinct embedding vector for each node (such as what may be taken in a transductive approach), the GNN is designed to include a set of aggregator functions that are trained to learn how to aggregate feature information from a node's local neighborhood.

In 402 of FIG. 4, for example, the local neighborhood of a particular node shaded in black may include other nodes shaded in lines and connected to the particular nodes by solid arrows. Each aggregator function aggregates information from a different number of hops, or search depth, away from a given node. For example, in 404, two example depths of neighborhood are shown, corresponding to a one-hop neighborhood (including the bolded and cross-line-shaded nodes in 404) within the smaller dotted circle and two-hop neighborhood (including the line-shaded nodes in 404) between the smaller and larger dotted circles. The two corresponding aggregator functions shown as 406 and 408 may be trained to aggregate the one-hop and two-hop neighborhood embedding information, respectively, in order to generate the embedding vector of the node. As such, embeddings of an unknown node can be generated using the aggregator functions from known embeddings of its neighborhood, as shown in 410. While the example shown in FIG. 4 illustrates an example implementation of aggregator functions at two neighborhood levels, an actual implementation is not so limited. The number of levels of trainable aggregation function may be more than two, and may be predetermined, or may be adaptively determined during a training process.

Further in some practical application scenarios, a graph may be dynamic, rather than static or quasi-static. In other words, composition and other characteristics of a graph may change or evolve over a relatively short time scale. In particular, new nodes may be added or deleted at any given time. Relationship may emerge or disappear frequently. Properties of one or more nodes and/or one or more edges may evolve. For a particular example in a social network, communication events such as emails and text messages are streaming while friendship relations continuously evolve.

In some example implementations, the dynamics of a graph may be represented by time snapshots of the graph. An example sequence of snapshots of a graph is illustrated as 502 through 510 in FIGS. 5A-5E, showing a time evolution dynamics of a graph, with example changes between the snapshots being indicated, e.g., new nodes and edges (addition of the black-shaded node from 502 to 504), new edge only (addition of the dark line from 504 to 506), node update (property update of the black-shaded node from 506 to 508), and edge update (property update of the dark line edge from 508 to 510).

For dynamic graphs, in order to take advantage of and to learn correlations and patterns in the time evolution of the nodes and the edges between different time versions of the graph, the GNN may be configured to process a sequence of snapshots of the graph in an order-dependent manner. In other words, the GNN described above may be configured as a permutation-dependent rather that permutation-invariant neural network with respect the order of the input snapshots of the graph. The temporal-aware GNN so trained and the embeddings so generated may thus carry the temporal correlations embedded in the snapshots of the graph. Depending on the dynamic time scale, the time series or snapshots can be long and the graph may correspondingly be large. Representing the graph over time by snapshots may be resource-consuming and may be difficult to scale, and the task for training a time-dependent GNN model using full snapshots of the graph may then become a multiplication from the static graph scenario. As such, storing/maintaining and training such time-dependent GNN based on these snapshots may become extremely resource-intensive.

In the various implementations below, a temporal-aware or permutation-dependent GNN is further disclosed. The example GNN is implemented by combining temporal-awareness with multi-layer neighborhood aggregation to further provide the GNN with inductive capabilities with respect to generating embeddings of a dynamic graph, all without creating multiple time snapshots of the graph. By using a temporal-aware message pass scheme involving a temporal-aware and permutation-dependent GNN, a set of temporal-aware local or neighborhood aggregator functions may be effectively trained and used for generating embeddings for unknown nodes and for providing more accurate embeddings for subsequent prediction tasks.

The example GNN implementations below may be designed to process a dynamic graph whose nodes may be generally bifurcated into two types, from which bipartite subgraphs may be extracted. A general example graph of this kind may include nodes for a plurality of entities (representing person, and other objects, and a mix of person and other objects) and events (that can occur to or can be associated with the entities). The entities, as first type of nodes in the graph, may be referred to as subject entities, in differentiation with the second type of event nodes. One or more events may have occurred to, reoccurred to, be associated with, or ceased to be associated with each of the entity at various times, and in certain time order or time sequence. The occurrences, reoccurrence, and association of the events may be represented by the edges in the graphs connecting the entities and the events. The same event may occur to the same entity in multiple occasions at different times (in other words, events can repeat with respect to an entity). In such situations, an example bipartite subgraph may be an entity as a first type of node connected to various events as a second type of nodes. The connection between the first type of nodes and the second type of nodes may be represented by a set of edges in the bipartite graph. The connections represent occurrences of the events and are associated with a time order of the occurrences.

For a specific example graph representing medical records of patients, the first type of nodes referred to as entity nodes in the graph may include a plurality of patients whereas the second type of nodes referred to as event nodes in the graph may include various diseases that the patients may be diagnosed with and various medicines or other treatments that the patients may receive. The occurrence of events, e.g., diagnosis of diseases and administration of medicines or medical treatment may be timestamped and thus can be ordered. An example bipartite subgraph for a particular patient in the form of a table is shown in Table 1 below. For simplicity, Table I only lists as events various diagnosed diseases for the example patent. These events are ordered in Table 1 according to the listed timestamps (the "Date" column, representing occurrence times of the events).

TABLE I

| Example Medical Event Dataset | | |
| --- | --- | --- |
| Patient_ID | Date | Disease |
| ID1 | 1959 Apr. 7 | Hypertension |
| ID1 | 1974 Jul. 2 | Diabetes |
| ID1 | 1974 Jul. 2 | Anemia (disorder) |
| ID1 | 1975 May 20 | Hypertriglyceridemia (disorder) |
| ID1 | 1975 May 20 | Chronic kidney disease stage 1 (disorder) |
| ID1 | 1975 May 20 | Diabetic renal disease (disorder) |
| ID1 | 1975 Jul. 8 | Metabolic syndrome X (disorder) |
| ID1 | 2008 Jul. 22 | Coronary Heart Disease |
| ID1 | 2019 Jan. 1 | Atrial Fibrillation |
| ID1 | 2020 Mar. 4 | Cough (finding) |
| ID1 | 2020 Mar. 4 | Sputum finding (finding) |
| ID1 | 2020 Mar. 4 | Muscle pain (finding) |
| ID1 | 2020 Mar. 4 | Joint pain (finding) |
| ID1 | 2020 Mar. 4 | Suspected COVID-19 |

Figure 6:
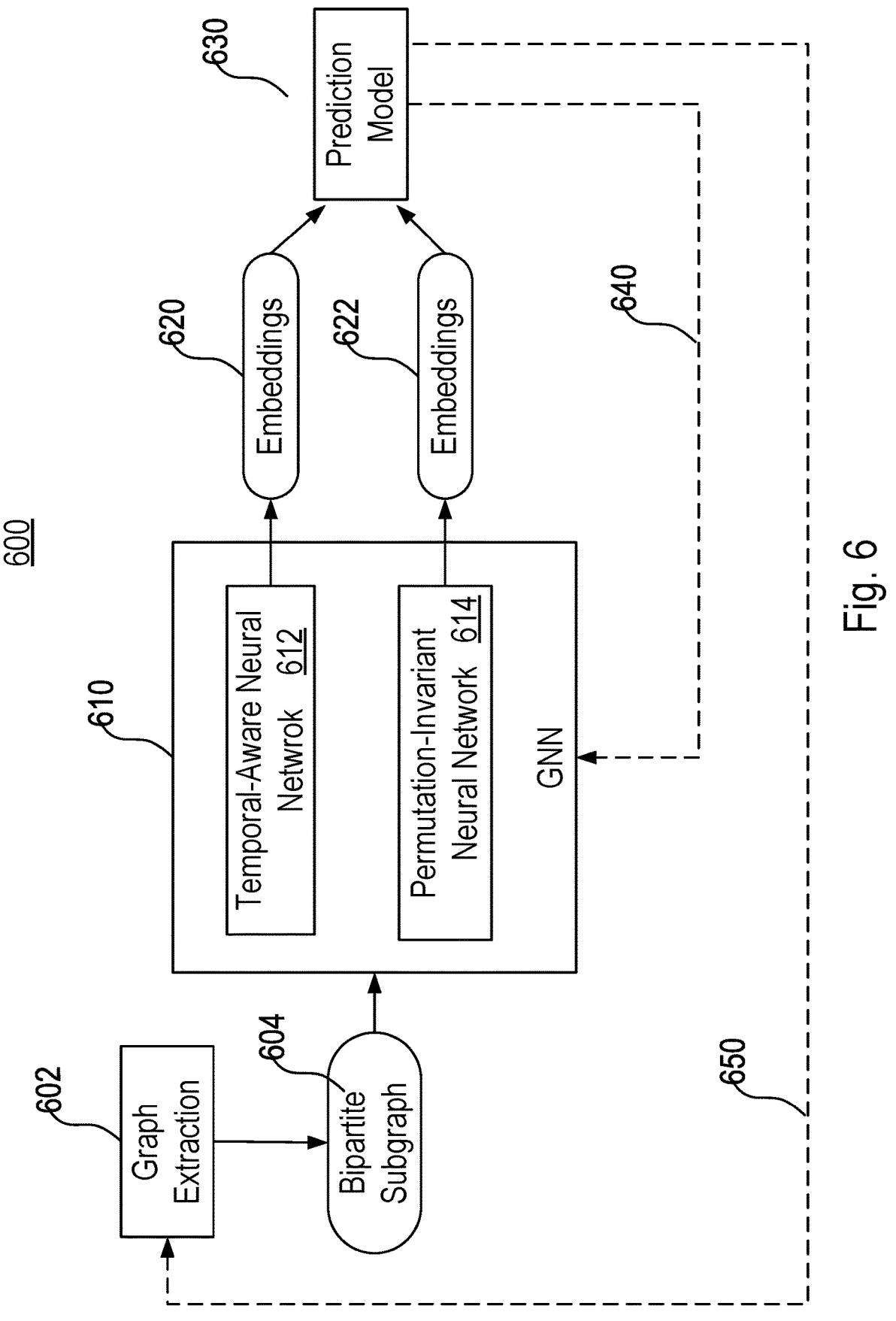
FIG. 6 illustrates an example processing flow for using a temporal-aware GNN to extract features in a graph and for using the extracted features to perform predictive task, and further illustrates a processing flow for training the temporal-aware GNN.

FIG. 6 shows an example process 600 for generating a prediction output from an input graph. The central components of process 600 include the GNN 610 for generating embeddings 620 and 622. The input to the GNN may be a bipartite subgraph 604 extracted from a graph via the extraction process 602. The embeddings 620 and 622 as generated by the GNN 610 are used as input to a prediction model 630 for generating a prediction output. In the particular context of the medical records above, the bipartite subgraph may represent a patient and corresponding ordered disease diagnostic, medicine administration, and medical treatment events. The prediction model, for example, may be constructed to predict a probability that a target event could occur to a subject entity such as a probability that a patient (subject entity, or target subject entity) could die from a virus infection (target event, e.g., die from COVID-19) given the corresponding medical history. The output of the process 600 thus includes both the prediction results and the embeddings of the input patients and diseases.

In the example of FIG. 6, the GNN 610 may include a temporal-aware (or permutation-dependent) neural network 612 and a permutation-invariant neural network 614. The temporal-aware neural network 612 may be configured/trained to generate embeddings for the entity type of nodes of the input bipartite subgraph (e.g., embeddings for patients in the medical records context). The permutation-invariant network 614 may be configured/trained to generate embeddings for the event type of nodes of the input bipartite subgraph. The bifurcation of the neural networks in the GNN 610 for the entity type of nodes and for the event type of nodes takes into consideration that time order of events is only relevant and worth learning with respect to particular entities rather than to the events themselves.

The GNN 610 and the prediction model 630 may be trained. The trained GNN 610 and the prediction model 630 may each include a set of model parameters. Once trained, an input bipartite subgraph 604 may be processed by forward-propagation through the GNN 610 to generate relevant embeddings and then processed by the prediction model to generate the prediction output.

The input bipartite subgraph may be extracted from the graph, as shown by 602. The extraction process may include collecting ordered events for each entity. For example, ordered diagnostic and treatment events for Patient 1 in the medical records context may be extracted, as shown below in Table II.

TABLE II

| Example Ordered Events | | |
| --- | --- | --- |
| Patient 1 | Apr. 26th, 2002 | Pneumonia |
| Patient 1 | Apr. 27th, 2002 | Penicillin |
| Patient 1 | May 17th, 2003 | Throat Infection |
| Patient 1 | May 18th, 2003 | Penicillin |

Figure 7:
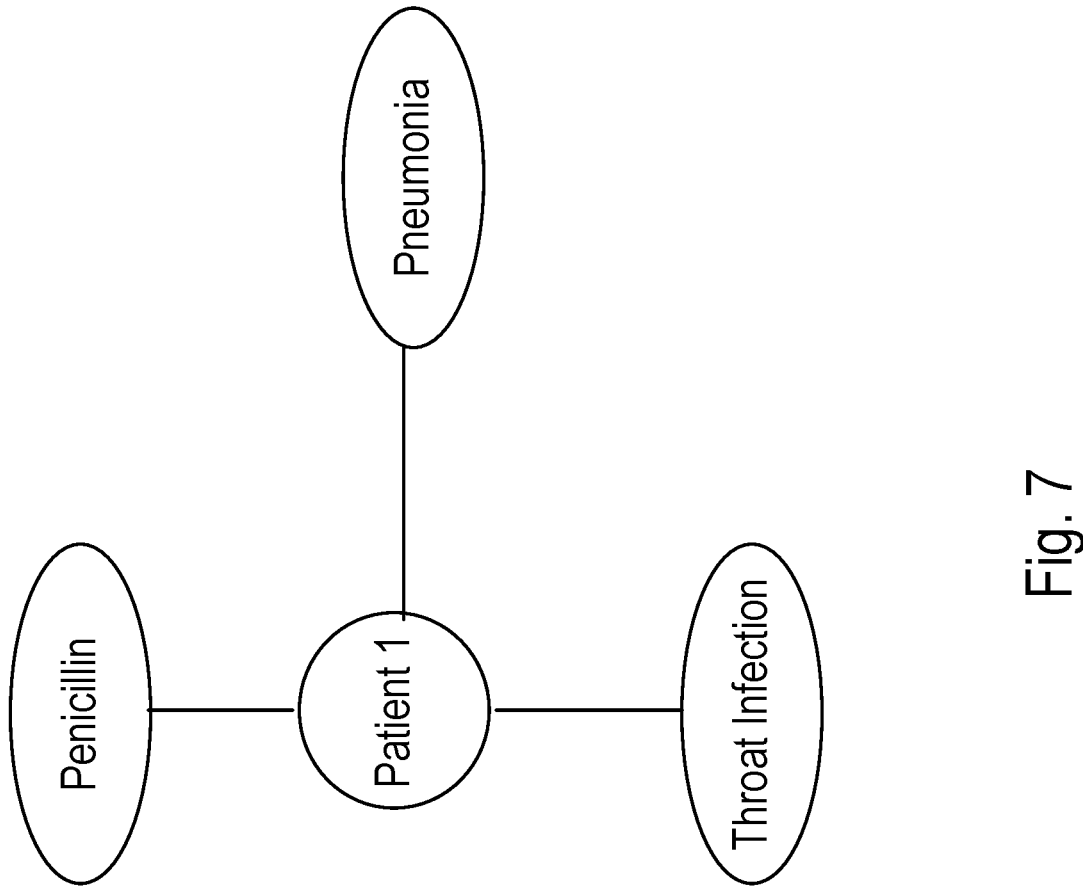
FIG. 7 illustrates an example bipartite subgraph.

An input bipartite subgraph thus includes an entity node connected to events nodes. In the example above, the entity Patient 1 is connected to three events: Pneumonia, Penicillin, and Throat Infection. In particular, Patient 1 has been diagnosed with "pneumonia" and "throat infection" and treated with "penicillin". The corresponding bipartite subgraph without order and repetition information is shown in FIG. 7. Very importantly in Table II, occurrences of these events are associated with a time order and some of these events may have occurred more than once, as indicated in Table II. It is thus important to capture the time order and the repetition information for the input bipartite graph. Such event order and repetition are graphically illustrated in FIGS. 8A-8D. In particular, the bipartite subgraph sequence of FIGS. 8A-8D shows the 4 ordered occurrences of 3 different events to Patient 1. Patient 1 was first diagnosed with pneumonia (802 of FIG. 8A), followed by treatment with penicillin (804 of FIG. 8B), followed by diagnosis of throat infection (806 of FIG. 8C), and further followed by a second treatment of penicillin (808 of FIG. 8D). The bipartite subgraphs of FIGS. 8A-8D thus capture the temporal information of the events.

Once the input bipartite subgraph is extracted, embeddings of the nodes in the bipartite graph, including the entity and the events, may be initialized by the GNN. For example, the embeddings for the nodes may be initialized as random embedding vectors in the embedding space of a predetermined number of dimensions, as shown in Table III. In some implementations, each dimension of the initial embedding vectors may be bounded or normalized. For example, each dimension of the initial embedding vectors may be bounded between [−1, 1].

TABLE III

| Embedding Initialization | |
| --- | --- |
| Patient 1 | [0.1, −0.2, −0.05 . . .] |
| Pneumonia | [−0.02, 0.1, 0.04 . . .] |
| Penicillin | [0.2, −0.1, −0.01 . . .] |
| Throat Infection | [−0.2, 0.01, 0.03 . . .] |

Following the initialization of the embeddings of the node in the input bipartite subgraph, the initial embeddings may be updated by the GNN. In the example implementation of FIG. 6 and as described above, the GNN 610 may provide two distinct processing paths for updating embeddings of the entity nodes and the event nodes. The embedding vectors of the entity nodes with their connection to ordered events, are updated by the temporal-aware neural network 612, whereas the embedding vectors of the event nodes are updated by the permutation-invariant neural network 614. The term "permutation-invariant" is used to represent the characteristic of

614 in that it does not depend any order and/or repetition of the events. On the other hand, the temporal-aware (or permutation-dependent) neural network 612 does depend on the order and repetition of occurrences of the events with respect to an entity. In other words, a same entity connected to a same set of events, but with difference in the order and/or repetition of occurrence of the events would lead to differences in the updated embedding vector for the entity by forward propagation through the temporal-aware neural network 612. The embedding vectors generated by the temporal-aware (or permutation-dependent) neural network 612 for the entities or subject entities may be referred to as a set of first-type embedding vectors, whereas the embedding vectors generated by the permutation-invariant neural network 614 for the event nodes may be referred to as a set of second-type embedding vectors.

The temporal-aware neural network 612 may be constructed to update/generate entity embedding vectors based on general temporal massage pass Network (TMPNN) and by aggregating corresponding neighbour events with their order taking into consideration. For example, for a given entity node (such as patient 1 above) connected with ordered event nodes, the general function of a TMPNN for processing input embedding vectors may be expressed as:

$$E(\text{Entity } 1) = M(E(\text{Entity } 1), T(E(\text{Event } 1), E(\text{Event } 2), E(\text{Event } 3), E(\text{Event } 4)))$$

For the particular example input shown in Table 2 and FIG. 8, the general TMPNN processing function may correspondingly be expressed as:

$$E(\text{Patient } 1) = M(E(\text{Patient } 1), T(E(\text{Pneumonia}), E(\text{Penicillin}), E(\text{Throat Infection}), E(\text{Penicillin})))$$

In the above, T( ) represents a temporal-aware aggregation function or network that aggregate over embedding vectors of neighborhood events of the entity, taking into account the order and repetition of the invent. The T( ) function or network is thus permutation-dependent with respect to the order and repetition pattern of occurrence of the events. Specifically, the output of the T( ) function above would be different if the repetition of pattern of the event is different or if the order of the event is of any difference.

M( ) may represent a differentiable functions acting on, for example, the output of the temporal-aware aggregation function (T( )), in an example form of a multi-layer perceptron (MLP) network of interconnecting neurons that connects the components of the embedding vectors of the Entity 1 (or Patient 1) with the embedding vector aggregated over the embedding vectors of neighbouring events.

Merely as examples, the temporal-aware aggregation function, for example may be implemented as a Long-Short-Term-Memory (LSTM) network or a one-dimensional convolutional neural network. An LSTM network, for example, can be configured to process the ordered sequence of occurrence of event as shown in FIG. 8.

The permutation-invariant network 614 of FIG. 6, on the other hand, may be constructed to update/generate event embedding vectors by performing neighborhood aggregation function without considering of any time order. For example, the permutation-invariant network 614 may be constructed to update the embedding vector of an event and corresponding entity according to:

$$E(\text{Event } 1) = N(E(\text{Event } 1), G(E(\text{Entity } 1)))$$

Specifically, for the "Pneumonia" event above, this permutation-independent network may perform the following function.

$$E(\text{Pneumonia}) = N(E(\text{Pneumonia}), G(E(\text{Patient } 1)))$$

The neighborhood aggregation function GO above may be implemented as a basic aggregation function such as mean function, sum function, or maximum function operated on the entity embedding vector. The N( ) function above may represent a differentiable functions acting on, for example, the output of the basic aggregation function (G( )), in an example form of an MLP network that connects the components of the embedding vectors of the Event (or Pneumonia) with the aggregated embedding vector by the GO function.

In some example implementations, the differentiable functions M( ) and N( ) above may be identical. For example, the differentiable functions of the temporal-aware neural network 612 and the permutation-invariant neural network 614 may be the same and thus embody, for example, a same MLP connectivity and a same set of MLP model parameters. In such implementations, the number of model parameters may be reduced compared to an alternative implementation where different M( ) and N( ) functions are separately implemented.

As further shown in FIG. 6, entity embeddings 620 and the event embeddings 622 as generated or updated respectively by the temporal-aware neural network 612 and the permutation-invariant neural network 614 may then be provided to one or more downstream analytical task, such as the prediction model 630 to generate a prediction outcome. In the context of the medical records example above, the patient embedding E(Patient 1) may be input into a classification model for determining whether the patient could die from a COVID-19 infection, and further, for quantifying a probability for the patient to die from the COVID-19 infection. The output probability, for example, may be normalized (e.g., in a range of [0,1]).

For training of the GNN 610 and the prediction model 630 of FIG. 6, labelled input bipartite subgraphs may be provided to the GNN 610 and prediction model 630 for forward propagation as described above. The prediction output via the forward propagation (e.g., a classification with or without probability quantification) may be compared to the labels for the input bipartite subgraphs in order to evaluate a loss function. The model parameters for the GNN 610 and the prediction model 630, including the parameters associated with the various aggregation functions and differentiable functions above of the temporal-aware neural network 612 and permutation-invariant neural network 614, model parameters associated with the prediction model (which, for example, may include another multi-layer neural network), and the learnable embeddings of the various known entity and event nodes of the input graph may be adjusted, updated, and optimized via back propagation using gradient descent. The forward and back propagation optimization processes iterate for each labelled input bipartite subgraph until the loss function converges or some other termination conditions are met, as shown by arrow 640 of FIG. 6. The model parameters are further updated/optimized by iterating through multiple labelled training bipartite subgraphs, as shown by arrow 650. In addition, multiple rounds of optimization of the overall loss function across all labelled bipartite training subgroups may be implemented, in order to converge to a final set of trained model parameters, as also shown by arrow 650.

In the example approach above, the GNN 610 for generating the embeddings of the various nodes is jointly trained with the prediction model 630, taking advantage of the availability of ground-truth labels with respect to the particular prediction task for the training datasets. After the GNN 610 and the prediction model 630 are jointly trained, they can be used, via forward-propagation, for calculating embedding of an unseen entity (e.g., patient) with a list of ordered and/or repeatable events (e.g., medical diagnosis and/or medical treatment/medicine administration) and for generating a prediction outcome.

The embeddings for various nodes as calculated by the GNN 610, may include correlations and features in the input graph that may be further utilized in some other separate prediction models for prediction. In some implementations, once the GNN 610 is trained, the embeddings of the various nodes in the input graph may be considered known, and another prediction models that may use such trained embeddings as input may be further trained with the embeddings of the nodes fixed and only the model parameters of the prediction model need to be iteratively trained via gradient descent.

When performing forward propagation in a trained GNN 610 to generate embeddings of unknown nodes (with trained/known aggregation functions and neighbouring embeddings), the embedding initialization of the unknown nodes may be performed in various example manners. In one example, the initial embedding of an unknown node may be randomized, particularly when no feature or property is known of the unknown node. Front propagation of the random embedding through GNN above with neighborhood aggregation would generate an output embedding vector for the unknown node. In some other examples, a subset or a portion of features or properties may nevertheless be known for the unknown node (e.g., gender or age of a patient). As such, the embedding of the unknown node may be initialized based on these known properties. A set of embedding initiator functions may be used. The embedding initiator functions may be constructed based on the types of known properties. Different properties or different sets of properties (e.g., age, gender, etc. for patient nodes) may correspond to different embedding initiator functions. Because different types of nodes may be associated with different properties (e.g., patient nodes may be associated with age and gender properties, whereas event nodes may not be), different embedding initiator functions may be constructed for different types of nodes. Each embedding initiator function may be represented by a set of model parameters. These parameters may be determined as part of the training process above. In other words, a set of embedding initiator functions (including property or node-type dependent embedding initiator functions, or a random initiator function for nodes without known properties) may be selectable for each input data during the training process in order to learn the various embedding initiator functions. Once these embedding initiator functions are determined as part of the trained temporal-aware and neighborhood aggregation GNN model above, they are then selected to first generate the initial embedding of an unknown node during the forward propagation process in order to generate an output embedding vector for the unknow input node.

The example implementations above thus leverage both temporal-aware neural network and multi-level neighborhood aggregation in GNN for embedding generation. Further, the example GNN includes two sets of neural networks that are bifurcated to handle temporal-aware analytics and separate permutation-invariant analytics to more accurately capture the various correlation features among the nodes and the edges. Such a GNN is inductive in that it is capable of generating embeddings of unknow nodes based on its neighborhood relations. It is also temporal-aware in that the embedding of a node generated by such a GNN depends not only on the composition of its neighbouring events but also on the order of the events and/or repetition pattern of the events. For training of the GNN (e.g., jointly with an actual prediction model), a temporal message passing scheme rather than full snapshots of a dynamic graph is used, thereby greatly improving the training efficiency and improving the accuracy and broad applicability of the embeddings so generated, while reducing the number model parameters in the GNN compared to the traditional snapshot approaches and/or transductive approaches.

While the various implementations above are described in the context of an application of data analytics of a set of medical records, the underlying principles are broadly applicable to a range of other contexts. In any application where data items may be bifurcated into various bipartite subgraphs (e.g., where the nodes can be characterized as either an entity type or event type) and where the temporal-dependency may be attributed to an order of occurrence of the events, the implementations of GNN above may be utilized.

In an example other than the medical records context, the GNN described above may be applied to automatic maintenance of industrial facility or equipment, such as large reciprocating equipment, e.g., pumps and compressors, or such as, major transportation equipment, e.g., aircraft or locomotives. Specifically, historical data items associated with a set of industrial facility components (such as various machineries) may include entities and events. The entities, for example, may include the various machines and equipment whereas the events may be related to various tests, diagnostics, maintenance, upgrades, and the like. Occurrences of these events with respect to any machine or equipment may be time-ordered and may repeat. As such, bipartite subgraphs similar to the medical records situation above may be extracted and used to train a temporal-aware and local-aggregating GNN for generating embeddings of unknown machines or equipment. Such embeddings may then be used by a prediction model to generate predictions. The prediction model, for example, may be configured and trained to automatically determine whether certain maintenance should be performed and provide automatic warning and/or triggering signals, or even initiate scheduling of maintenance and ordering of parts from inventory, for example.

Figure 9:
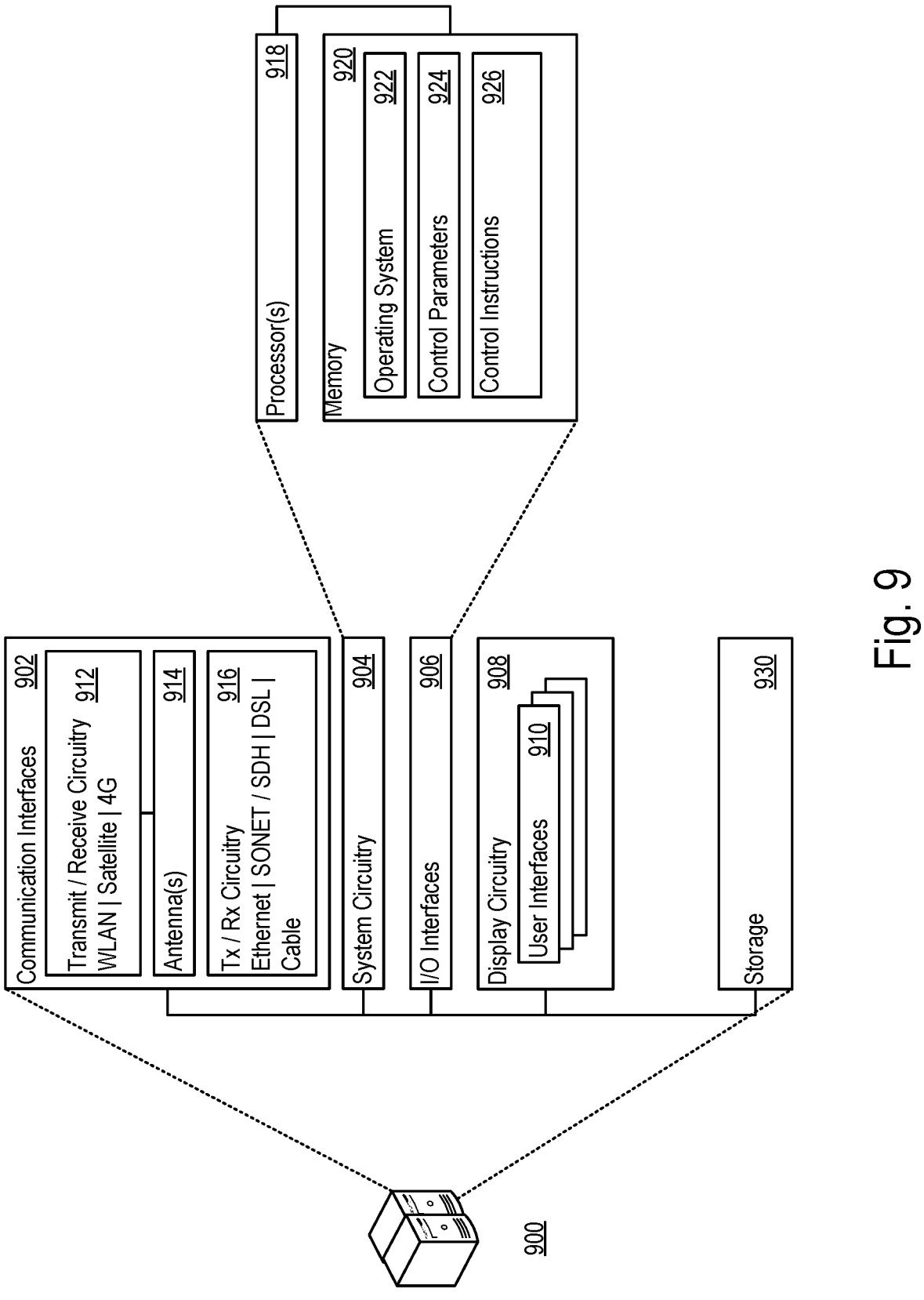
FIG. 9 shows an example computing device suitable for implementing the GNN and other circuitry above.

Finally, FIG. 9 illustrates an exemplary architecture of a computing device 900 on which the various computing components of the system described above. The computing device 900 may include communication interfaces 902, system circuitry 904, input/output (I/O) interface circuitry 906, and display circuitry 908. The graphical user interfaces (GUIs) 910 displayed by the display circuitry 908 may be used to receive user commands/input and to display various outputs. The GUIs 910 may be displayed locally using the display circuitry 908, or for remote visualization, e.g., as HTML, JavaScript, audio, and video output for a web browser running on a local or remote machine.

The GUIs 910 and the I/O interface circuitry 906 may include touch sensitive displays, voice or facial recognition inputs, buttons, switches, speakers and other user interface elements. Additional examples of the I/O interface circuitry 906 includes microphones, video and still image cameras, headset and microphone input/output jacks, Universal Serial Bus (USB) connectors, memory card slots, and other types of inputs. The I/O interface circuitry 906 may further include magnetic or optical media interfaces (e.g., a CDROM or DVD drive), serial and parallel bus interfaces, and keyboard and mouse interfaces.

The communication interfaces 902 may include wireless transmitters and receivers ("transceivers") 912 and any antennas 914 used by the transmit and receive circuitry of the transceivers 912. The transceivers 912 and antennas 914 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 902 may also include serial interfaces, such as universal serial bus (USB), serial ATA, IEEE 1394, lighting port, I²C, slimBus, or other serial interfaces. The communication interfaces 902 may also include wireline transceivers 916 to support wired communication protocols. The wireline transceivers 916 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 904 may include any combination of hardware, software, firmware, APIs, and/or other circuitry. The system circuitry 904 may be implemented, for example, with one or more systems on a chip (SoC), application specific integrated circuits (ASIC), Central Processing Units (CPUs), Graphical Processing Units (GPUs), microprocessors, discrete analog and digital circuits, and other circuitry. The system circuitry 904 may implement any desired functionality of the disclosed system and its various components. As just one example, the system circuitry 904 may include one or more instruction processor 918 and memory 920. The instruction processors may be one or more CPUs, GPUs, or other type of processors. The various neural network described above, for example, may be implemented in one or more GPUs.

The memory 920 may be implemented as a non-transitory memory circuit and may store, for example, control instructions 926 for implementing the various functions described above, as well as an operating system 922. In one implementation, the processor 918 executes the control instructions 926 according to control parameters 924 and execute the operating system 922 to carry out any desired functionality of the embedding generation above.

The computing device 900 may further include various data sources 930, or may be in communication with external data sources. Each of the databases that are included in the data sources 930 may be accessed by the various component of the disclosed system and its components.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

We claim:

1. A system comprising:

a memory circuitry for storing computer instructions; and a processor in communication with the memory circuitry, the processor being configured to execute the computer instructions from the memory circuitry to:

receive a data structure representing a bipartite graph having a first type of node connected to a plurality of second type of nodes by a set of edges, the first type of node being associated with a subject entity, the plurality of second type of nodes being associated with a set of events, and the set of edges being associated with occurrences of the set of events to the subject entity;

extract a time order of the set of edges according to occurrence times of the set of events to the subject entity;

provide a first multilayer neural network being configured to implement a first aggregation function that is temporal-aware and permutation-dependent with respect to the set of events;

provide a second multilayer neural network being configured to implement a second aggregation function that is permutation-invariant with respect to the set of events;

generate a first-type embedding vector associated with the subject entity by processing the data structure with the time order using the first multilayer neural network, the first-type embedding vector being associated with a multidimensional embedding space, wherein the first multilayer neural network is further configured to implement a first differentiable function acting on an output of the first aggregation function to generate the first-type embedding vector;

generate a set of second-type embedding vectors associated with the set of events in the multidimensional embedding space using the second multilayer neural network, wherein the second multilayer neural network is further configured to implement a second differentiable function acting on an output of the second aggregation function to generate the set of second-type embedding vectors; and generate probability of occurrence of a target event to the subject entity based on the first-type embedding vector and the set of second-type embedding vectors using a prediction model.

2. The system of claim 1, wherein the target event differs from the set of events.

3. The system of claim 1, wherein the first differentiable function is implemented as a first multilayer perceptron (MLP) network.

4. The system of claim 1, wherein the first aggregation function performs a neighborhood aggregation of event embedding vectors.

5. The system of claim 4, wherein the first aggregation function comprises a Long-Short-Term Memory (LSTM) network to process the event embedding vectors according to the time order.

6. The system of claim 4, wherein the first aggregation function comprises a one-dimensional convolutional neural network to process the event embedding vectors according to the time order.

7. The system of claim 1, wherein the second differentiable function is implemented as a second multilayer perceptron (MLP) network.

8. The system of claim 1, wherein the first differentiable function and the second differentiable function are identical.

9. The system of claim 1, wherein the second aggregation function is configured to perform neighborhood aggregation of entity embedding vectors by sum, mean, or maximum.

10. The system of claim 1, wherein the first multilayer neural network, the second multilayer neural network, and the prediction model are obtained by joint training.

11. The system of claim 10, wherein the first multilayer neural network, the second multilayer neural network, and the prediction model are jointly trained using a plurality of training bipartite graphs with entity nodes labeled with ground-truth with respect to the prediction model.

12. A method performed by a processor when executing computer instructions from a memory circuitry, the method comprising:

receiving a data structure representing a bipartite graph having a first type of node connected to a plurality of second-type nodes by a set of edges, the first type of node being associated with a subject entity, the plurality of second-type nodes being associated with a set of events, and the set of edges being associated with occurrences of the set of events to the subject entity;

extracting a time order of the set of edges according to occurrence times of the set of events to the subject entity;

providing a first multilayer neural network being configured to implement a first aggregation function that is temporal-aware and permutation-dependent with respect to the set of events;

providing a second multilayer neural network being configured to implement a second aggregation function that is permutation-invariant with respect to the set of events;

generating a first-type embedding vector associated with the subject entity by processing the data structure with the time order using the first multilayer neural network, the first-type embedding vector being associated with a multidimensional embedding space, wherein the first multilayer neural network comprises a first differentiable function acting on an output of the first aggregation function to generate the first-type embedding vector;

generating a set of second-type embedding vectors associated with the set of events in the multidimensional embedding space using the second multilayer neural network, wherein the second multilayer neural network is further configured to implement a second differentiable function acting on an output of the second aggregation function to generate the set of the second-type embedding vectors; and generating probability of occurrence of a target event to the subject entity based on the first-type embedding vector and the set of second-type embedding vectors using a prediction model.

13. The method of claim 12, wherein the target event differs from the set of events.

14. The method of claim 12, wherein the first differentiable function is implemented as a first multilayer perceptron (MLP) network.

15. The method of claim 12, wherein the first aggregation function performs a neighborhood aggregation of event embedding vectors.

16. The method of claim 15, wherein the first aggregation function comprises a Long-Short-Term Memory (LSTM) network to process the event embedding vectors according to the time order.

* * * * *